Feb. 7, 1939.                H. L. BONE                2,146,463
DRIVE MECHANISM FOR SPEED RESPONSIVE DEVICES FOR RAILWAY TRAINS
           Original Filed March 20, 1935     3 Sheets-Sheet 1

INVENTOR
Herbert L. Bone.
BY
HIS   ATTORNEY

Feb. 7, 1939.                H. L. BONE                2,146,463
       DRIVE MECHANISM FOR SPEED RESPONSIVE DEVICES FOR RAILWAY TRAINS
              Original Filed March 20, 1935    3 Sheets-Sheet 2

INVENTOR
Herbert L. Bone.
BY
HIS ATTORNEY

Feb. 7, 1939.   H. L. BONE   2,146,463
DRIVE MECHANISM FOR SPEED RESPONSIVE DEVICES FOR RAILWAY TRAINS
Original Filed March 20, 1935   3 Sheets-Sheet 3

INVENTOR
Herbert L. Bone.
BY
HIS ATTORNEY

Patented Feb. 7, 1939

2,146,463

UNITED STATES PATENT OFFICE 2,146,463

DRIVE MECHANISM FOR SPEED RESPONSIVE DEVICES FOR RAILWAY TRAINS

Herbert L. Bone, Forest Hills, Pa., assignor to The Union Switch & Signal Company, Swissvale, Pa., a corporation of Pennsylvania Original application March 20, 1935, Serial No. 12,002. Divided and this application September 30, 1937, Serial No. 166,707

9 Claims. (Cl. 74—12)

My invention relates to drive mechanisms for speed responsive devices for railway trains, and has for an object the provision of novel and improved drive mechanism by which the speed responsive device may be mounted adjacent an end of an axle of a vehicle of a railway train, the speed of which is to be determined. Another object of the invention is the provision of apparatus of the type here involved which may at times be disconnected from the vehicle axle and such condition checked. Other objects and advantages of my invention will appear as the specification progresses.

I shall describe two forms of apparatus embodying my invention, and shall then point out the novel features thereof in claims.

This application is a division of my copending application for United States Letters Patent, Serial No. 12,002, filed March 20, 1935, for Speed responsive devices, now Patent No. 2,113,645, granted April 12, 1938.

Figure 1:
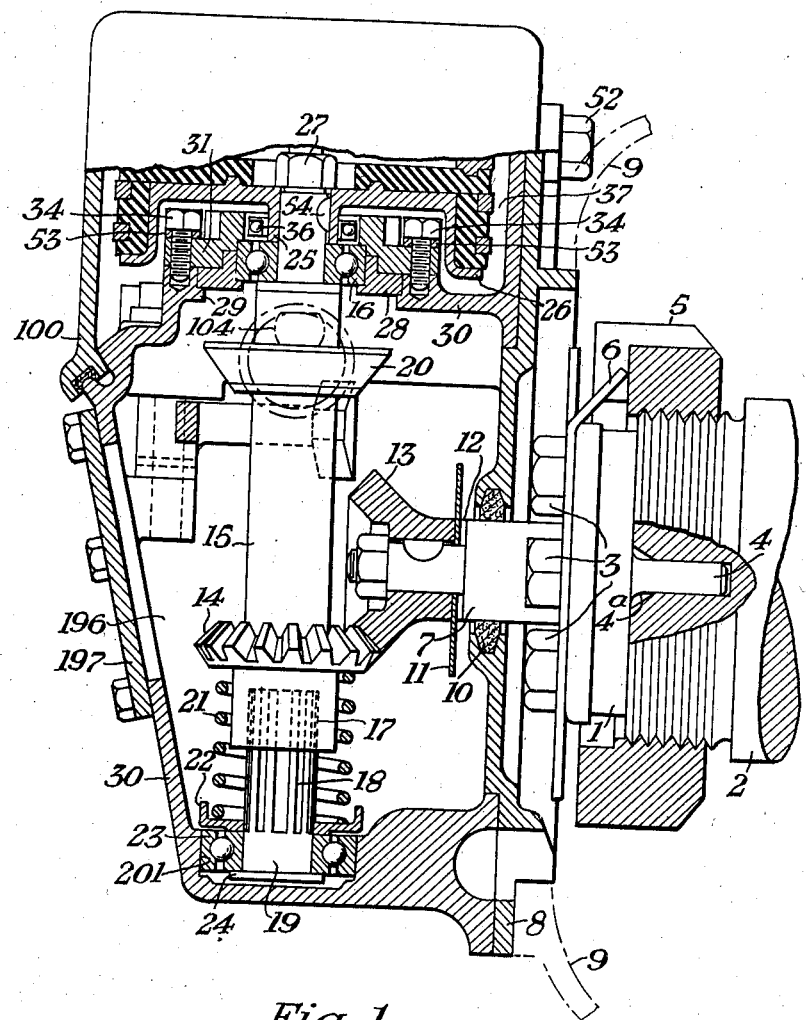
Figure 3:
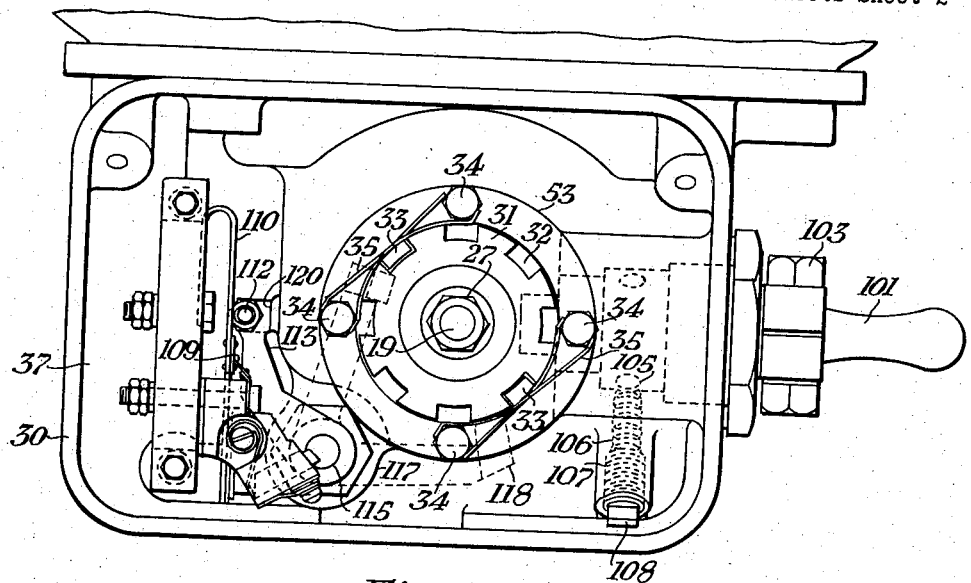
Figure 2:
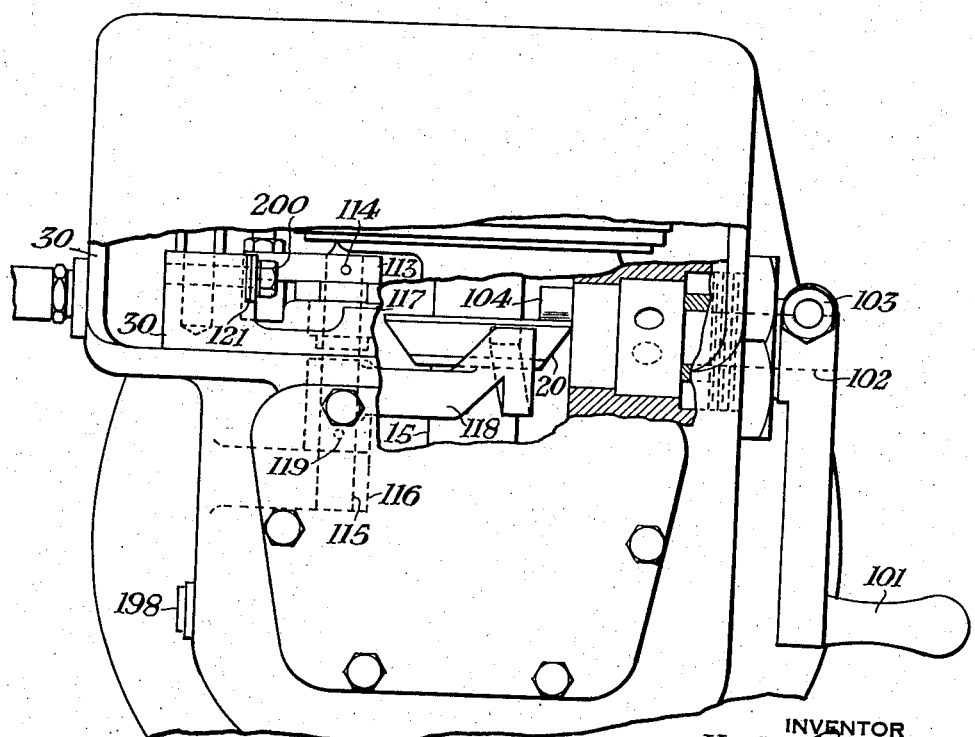
Figures 4, 5:
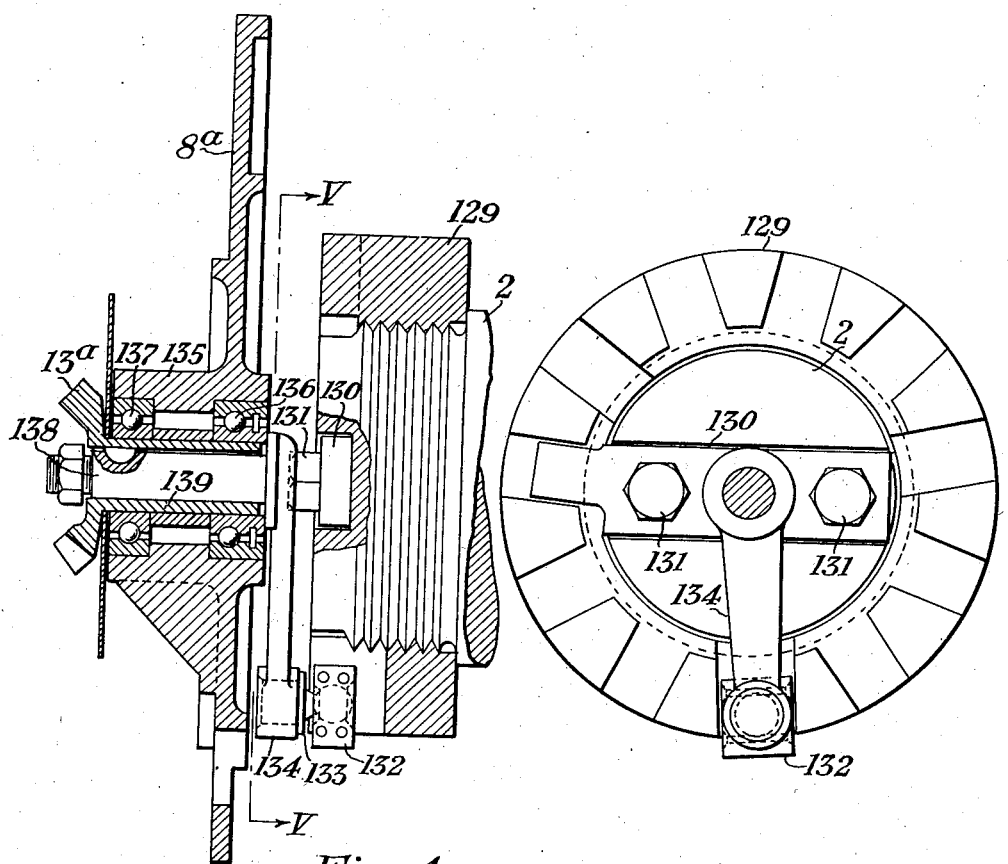

In the accompanying drawings, Fig. 1 is a vertical view partly in section of one form of mechanism embodying my invention. Fig. 2 is a side view of the mechanism of Fig. 1 with certain parts removed and broken away to show the cut-out mechanism. Fig. 3 is a plan view of the mechanism of Fig. 1 with certain parts removed to show the cut-out mechanism and the circuit controller contacts operated thereby. Fig. 4 is a view partly in section of an alternative means of operatively connecting the drive mechanism of Fig. 1 with the vehicle axle. Fig. 5 is a view taken on the line V—V of Fig. 4.

In each of the several views, like reference characters designate similar parts.

Referring to Fig. 1, an axle extension plate 1 is bolted to the end of an axle 2 of a vehicle of a railway train by means of tap bolts 3, and is centered and solidly keyed to the axle 2 by means of a dowel pin 4 which fits into the axle center, and by a bar-shaped lug 4ª which fits into a slot in the end of the axle. To lock the usual bearing nut 5 for the axle 2, a sheet metal washer 6 is provided, the washer 6 being so designed that portions of it can be bent down into the usual locking slots provided in the face of the bearing nut 5, the portions to be bent down being so spaced that the nut 5 can be moved in small steps. A shaft portion or pin 7 is formed integral on the axle extension plate 1 and projects through a separating plate 8 which plate is secured to a main casting 30 by tap bolts such as shown at 52. The main casting 30 is mounted on the vehicle by being secured to the axle bearing housing 9 of the vehicle axle 2 in any convenient manner not shown. This casting 30 forms a casing having two chambers, a gear chamber 196 and a governor head chamber 37, the gear chamber 196 being provided with an inspection plate 197 and an oil filler plug 198 (see Fig. 2) and the governor head chamber 37 being provided with a dirt proof cover 199. The plate 8 is provided with a felt oil seal washer 10 to prevent creepage of oil. As an additional means to prevent transfer of oil between the driving portion of the speed responsive device and the bearing of the axle 2, an oil deflecting plate 11, which is a thin metal disk, is also carried on the shaft portion 7. Suitable shims 12 are provided behind the oil deflecting plate 11 so that a bevel gear 13, which is keyed and bolted to the shaft 7, can be properly positioned with respect to a mating bevel gear 14. The driven gear 14 is cut on a tubular shaft 15 which extends from a point some little distance below the back of the gear 14, upward to the inner race of an upper ball bearing 16. The inner surface of the tubular shaft 15 is provided with splines 17 near its lower end which mate with splines 18 cut on a spindle 19. The tubular shaft 15 is also provided with a shifting plate 20, the purpose of which will be explained later. The driven gear 14 is held in its upper position by a spring 21 which presses against the back of the gear and rests in a cup 22, and the lower face of the cup 22 in turn rests against the inner race of a lower ball bearing 23, the ball bearing 23 being held from slipping off the spindle 19 by a collar 24 formed on the end of the spindle 19.

The outer race of the upper ball bearing 16 is held in a bearing retainer 28, which fits into a machined pocket 29 in the main casting 30. The bearing retainer 28 is held in place by means of a large nut 31 which is provided with clearance so that the outer race of the bearing 16 is not clamped although the bearing retainer 28 is clamped solidly. The nut 31 (see Fig. 3) is provided with locking slots 32 adapted to receive the lock members 33 of a lock washer 53, and which washer is in turn secured in position by tap bolts 34 screwed into the main casting 30. Locking wires 35 may be threaded through holes of the tap bolts 34 if desired. The nut 31 is provided with an oil seal 36 which prevents creepage of oil from the gear chamber 196 into the governor head chamber 37. The inner race of the bearing 16 is held in place against the upper end of the tubular shaft 15 by the hub 25 of a collector ring drum 26 which drum is keyed to the spindle 19 at 54 and is drawn down by means of a nut 27 on a threaded portion of the spindle 19. The outer race of the lower ball bearing 23 fits into a machined pocket 201 in the main casting 30. Inasmuch as the lower ball bearing 23 is held in position by the collar 24 on the lower end of the spindle 19 and the hub 25 of the collector ring drum 26 is held in position against the upper surface of the inner race of the bearing 16, all the forces set up by the spring 21 are taken up in the tubular shaft 15 itself. The only thrust transmitted through the shaft 15 is that resulting from the endwise thrust of the gear 14 and the weights of the gear 14 and shaft 15. This thrust as well as the weights of the spindle 19, the collector ring drum 26 and a governor head mounted thereon are carried on the upper ball bearing 16 since the lower bearing 23 is free to move endwise in its pocket 201 as will be understood by an inspection of Fig. 1, and can carry no thrust. Hence the spindle 19 is accurately journaled in the main casting 30 in a vertical position, and the gear 14 mounted on the spindle 19 is held in mesh with the gear 13 secured to the train axle 2 with the result that the spindle 19 and collector ring drum 26 are normally rotated at a speed corresponding to the speed of the train, the thrust and weight of this drive mechanism being carried on the upper ball bearing 16. As will appear hereinafter, the tubular shaft 15 is at times depressed and the gear 14 lowered out of mesh with the gear 13 with the result that the spindle 19 and drum 26 are not then driven by the train axle 2.

The bearing (not shown) for the train axle 2 may be of the usual self-aligning type which type permits movement of the axle 2 about the center of the spherical surface of the bearing, and thus a slight up and down motion of the driving gear 13 is permitted. In order to prevent disengagement of the gears 13 and 14 when the driving gear 13 moves upward, the gear teeth are made as large as possible; and to prevent breakage of the gear teeth when the gear 13 moves downward, the spring 21 is so proportioned and adjusted that before sufficient force to break the teeth is obtained, the spring is compressed.

The speed responsive mechanism mounted on the collector ring drum 26, and for which the apparatus of the instant application forms the drive mechanism, is fully described in my aforementioned application Serial No. 12,002 and need not be here repeated.

In order that the drive mechanism may at times be disconnected from the vehicle axle 2, I provide a disengaging mechanism which is operated through the medium of a handle located outside of the main casing or housing.

Referring to Figs. 2 and 3, as well as to Fig. 1, the handle 101 is secured by means of a bolt 103 to a shaft 102 which is journaled in a bearing in the main casting 30 and the inner end of which terminates in an eccentric 104, the eccentric being in turn adapted to engage the shifting plate 20 on the tubular shaft 15. The arrangement is such that with the handle 101 down as illustrated in Fig. 2, the eccentric 104 is free from the plate 20 and the gears 13 and 14 are in mesh by virtue of the biasing spring 21, but that with the handle 101 lifted one-half turn the eccentric 104 engages the shifting plate 20 to force the tubular shaft 15 downward against the action of the spring 21, and the driven gear 14 is disengaged from the driving gear 13 and an inoperative condition of the spindle 19 is established. The flat surface of the eccentric 104 rests firmly on the upper surface of the shifting plate in this disengaged position. The handle 101 and the eccentric 104 are held in the position corresponding to the engaging position of the gears by means of a steel ball 105 engaging a hemispherical depression in the shaft 102, the ball 105 being forced into position by means of a heavy coil spring 106 located in a tubular cavity 107 which is closed at its outer end by a pipe plug 108. A corresponding depression in the shaft 102 is also provided for the disengaging position of the handle 101.

In order to check that the spindle 19 is disconnected from the driving axle 2, the movement of the shifting plate 20 is made to operate a spring contact 110, the arrangement being such that the contact 109—110 is closed when the plate 20 is up and the contact is opened when the plate is forced downward. The contact spring 110 is operated by a pin 112 of suitable insulating material and which pin is held in a lever 113, the lever 113 being in turn pinned at 114 to a shaft 115. The shaft 115 is journaled in two bearings 116 and 117 formed in the main casting 30 and has pinned to it at 119 a forked cam-shaped lever 118 which lever is adapted to be operated by the shifting plate 20. A flat biasing spring 121 held rigid at one end by a tap screw 200 engages the lever 113 and tends to rotate the lever 113 clockwise to force it back against a stop 120. The cam surface of one of the arms of the forked lever 118 engages the lower face of the edge of the shifting plate 20 and is so shaped that downward movement of the plate 20 operates the forked lever 118 counter-clockwise as viewed in Fig. 3 and the lever 113 and pin 112 are moved to the left against the force of the biasing spring 121 with the result that the contact spring 110 is forced out of engagement with the contact spring 109 and the circuit connection therethrough is interrupted. When the shifting plate 20 is moved upward, the cam lever 118 is operated clockwise by action of the spring 121 and by the second of the arms of the forked lever 118 engaging the top edge of the plate 20 and the pin 112 is moved to the right away from the contact spring 110 and that spring by its own resilience engages the contact spring 109 to close the circuit connection therethrough. Normally the lever 113 would be operated by the biasing spring 121 alone during this later operation, the forked lever being provided as protection in case the spring 121 should break. The parts are so proportioned that, when the shifting plate 20 occupies its full upward position, the cam surfaces of the forked lever 118 do not touch the plate since the spring 121 engages the lever 113 and forces it back against a stop 120. It follows that with the handle 101 down, the spindle 19 is operatively connected with the axle 2 through the drive mechanism including the gears 13 and 14, and the circuit contact 109—110 is closed, but that with the handle 101 rotated upward one-half turn, the spindle 19 is disconnected from the axle 2 and the contact 109—110 is open, the handle 101 being held in either of its two positions through the medium of the spring 106.

A second form of mechanism for operating the spindle 19 is shown in Figs. 4 and 5. Referring to Figs. 4 and 5, the train axle 2 is threaded at its outer end to receive a nut 129 which is normally provided in roller bearing application to secure the inner race of the bearing. The face of the nut 129 is slotted to receive a lock bar 130 which is held in place by tap bolts 131 screwed into the end of the axle 2. At least one of the slots in the face of the nut 129 is finished to receive a driving ball nut 132 of a driving pin 133 which is secured in a crank 134. This crank 134 is provided with a shaft pin 138 to which is keyed a driving gear 13ª. A separating plate 8ª, which is carried on the main casting 30 in a manner similar to the separating plate 8 of Fig. 1, is provided with a hub 135 which is bored to receive two ball bearings 136 and 137, and in which bearings the hub 139 of the driving gear 13ª is journaled. As set forth in connection with Fig. 1, the vehicle axle 2 may be equipped with a self-aligning bearing which permits an up and down motion of the axle. It is clear that with the drive mechanism constructed as shown in Figs. 4 and 5 the driving ball nut 132 may move back and forth in the slot of the nut 129 with the result that the meshing of the driving gear 13ª with its mate is not affected by the up and down motion of the vehicle axle 2. It is to be seen, therefore, that the spindle 19 of the speed responsive device of Fig. 1 may readily be provided with the mechanism of Figs. 4 and 5.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination with a vehicle axle of the type provided with a threaded end to receive a nut which is slotted in its face to receive a lock bar secured to the end of the axle, a spindle journaled on the vehicle in a vertical position adjacent one end of the axle and having fixed thereto at its lower end a bevel gear, a shaft pin journaled coaxially with the vehicle axle, a bevel gear fixed on said pin to mesh with the bevel gear of the spindle, and a crank arm fixed on said shaft pin and having at its outer end a drive pin to slidably fit a slot of said nut for operating the spindle in response to rotation of said axle.

2. In combination with a vehicle axle of the type provided with a threaded end to receive a nut which is slotted in its face to receive a lock bar secured to the end of the axle, a spindle journaled on the vehicle adjacent one end of the axle and disposed at right angles thereto, a bevel gear fixed on said spindle, a horizontal shaft pin journaled substantially coaxially with the axle at the end thereof and having fixed thereon a bevel gear for meshing with the first mentioned gear, a crank arm in fixed relation with the shaft pin, and a drive pin secured to the outer end of the crank arm to fit into one of the slots of said nut for driving the spindle in response to rotation of the axle notwithstanding a limited amount of up and down motion of the axle.

3. In combination with a vehicle axle of the type provided with a threaded end to receive a nut which is slotted in its face to receive a lock bar secured to the end of the axle, a housing mounted on the vehicle adjacent one end of the axle, a spindle journaled in said housing with its center line at right angles to the center line of the axle, a bevel gear fixed on said spindle, a shaft pin journaled in said housing substantially coaxially with the axle and having fixed thereon a bevel gear to mesh with the first mentioned bevel gear, a crank arm secured to said pin, and a driving pin member secured to the outer end of said crank arm to fit a slot of said nut for driving said spindle in response to rotation of the axle unaffected by the up and down motion of said axle.

4. In combination with a vehicle axle, a spindle journaled on the vehicle in a vertical position at an end of the axle, a tubular shaft mounted on the spindle and provided with splines which mate with splines on the spindle, a bevel gear cut on said shaft, a shaft pin having a bevel gear keyed thereon adaptable of engagement with the first mentioned bevel gear, means including a plate secured to the end of the axle to mount said shaft pin coaxially with the vehicle axle, means including a spring back of the gear on the tubular shaft to bias that gear into mesh with the gear on the shaft pin for operating the spindle, a shifting plate fixed on said tubular shaft, and means cooperating with said shifting plate for at times shifting said tubular shaft for disengaging said gears.

5. In combination with a vehicle axle, a spindle, means to journal said spindle in a vertical position at an end of said axle, a tubular shaft mounted on said spindle and provided with splines which mate with splines on the spindle, a bevel gear in fixed relation with the tubular shaft near its lower end and a shifting plate fixed on the shaft near its upper end, a shaft pin mounted coaxially with the axle and operatively connected therewith for rotation with the axle, another bevel gear fixed on said shaft pin and disposed above and meshing with the first mentioned bevel gear, spring means back of said first mentioned gear to bias the gears into mesh, means including an eccentric disposed above said shifting plate effective when rotated to shift the tubular shaft against the bias of the spring means to disengage said gears, a manually operable handle having a first and a second position, and means actuated by said handle when moved from its first to its second position to rotate said eccentric as required to disengage the gears.

6. In combination with a vehicle axle, a spindle, means to journal said spindle in a vertical position at an end of said axle, a tubular shaft mounted on said spindle and provided with splines which mate with splines on the spindle, a bevel gear in fixed relation with the tubular shaft near its lower end and a shifting plate fixed on the shaft near its upper end, a shaft pin mounted coaxially with the axle and operatively connected therewith for rotation with the axle, another bevel gear fixed on said shaft pin and disposed above and meshing with the first mentioned bevel gear, spring means back of said first mentioned gear to bias the gears into mesh, means including an eccentric disposed above said shifting plate effective when rotated to shift the tubular shaft against the bias of the spring means to disengage said gears, a manually operable handle having a first and a second position, means actuated by said handle when moved from its first to its second position to actuate said eccentric as required to disengage said gears, and other spring means effective to lock said handle in each of its two positions against movement due to vibration.

7. In combination with a vehicle axle, a spindle, means to journal said spindle in a vertical position at an end of said axle, a tubular shaft mounted on said spindle and provided with splines which mate with splines on the spindle, a bevel gear in fixed relation with the tubular shaft near its lower end and a shifting plate fixed on the shaft near its upper end, a shaft pin mounted coaxially with the axle and operatively connected therewith for rotation with the axle, another bevel gear fixed on said shaft pin and disposed above and meshing with the first mentioned bevel gear, spring means back of said first mentioned gear to bias the gears into mesh, means including an eccentric disposed above said shifting plate effective when rotated to shift the tubular shaft against the bias of the spring means to disengage said gears, a manually operable handle having a first and a second position, means actuated by said handle when moved from its first to its second position to rotate said eccentric as required to disengage said gear, a circuit controlling contact, and cam means engaging said shifting plate operative to open the contact when the plate is moved by said handle and to close the contact when the plate is moved in response to said spring means.

8. In combination with a vehicle axle, a spindle, means to journal said spindle in a vertical position at an end of said axle, a tubular shaft mounted on said spindle and provided with splines which mate with splines on the spindle, a bevel gear in fixed relation with the tubular shaft near its lower end and a shifting plate fixed on the shaft near its upper end, a shaft pin mounted coaxially with the axle and operatively connected therewith for rotation with the axle, another bevel gear fixed on said shaft pin and disposed above and meshing with the first mentioned bevel gear, spring means back of said first mentioned gear to bias the gears into mesh, means including an eccentric disposed above said shifting plate effective when rotated to shift the tubular shaft against the bias of the spring means to disengage said gears, manually operable means connected with said eccentric effective when actuated to a given position to rotate the eccentric as required to disengage said gears, a contact, other spring means to bias said contact to a closed position, and a rotatable lever operatively connected with the shifting plate to open said contact against the force of said other spring means when the plate is shifted to disengage said gears.

9. In combination with a vehicle axle, a housing mounted on the vehicle adjacent an end of the axle, a spindle having a threaded end and a collar formed on the other end, a tubular shaft slidably mounted on the spindle and having splines that mate with splines on the spindle, a bevel gear and a shifting plate fixed on said shaft, means including two ball bearings to mount said spindle in said housing in a vertical position adjacent the end of the axle with said collar below the axle, the lower one of said bearings disposed in a machined pocket in the housing and its inner race against the collar, the upper one of said bearings disposed in a retainer ring secured to the housing, means including a nut on said threaded end and a hub member above the inner race of said upper bearing to suspend said spindle and shaft from the upper bearing, a shaft pin mounted coaxially with the axle and operatively connected therewith, another bevel gear fixed on said shaft pin, spring means including a spring disposed between the back of the gear on the tubular shaft and the lower bearing to bias the two gears into engagement, and manually operable means including an eccentric above the shifting plate effective when rotated to shift the tubular shaft against the bias of the spring means to disengage said gears.

HERBERT L. BONE.